Jan. 26, 1943.  W. A. KOSKEN ET AL  2,309,403
PHOTOGRAPHIC CAMERA
Filed July 20, 1940  4 Sheets-Sheet 3
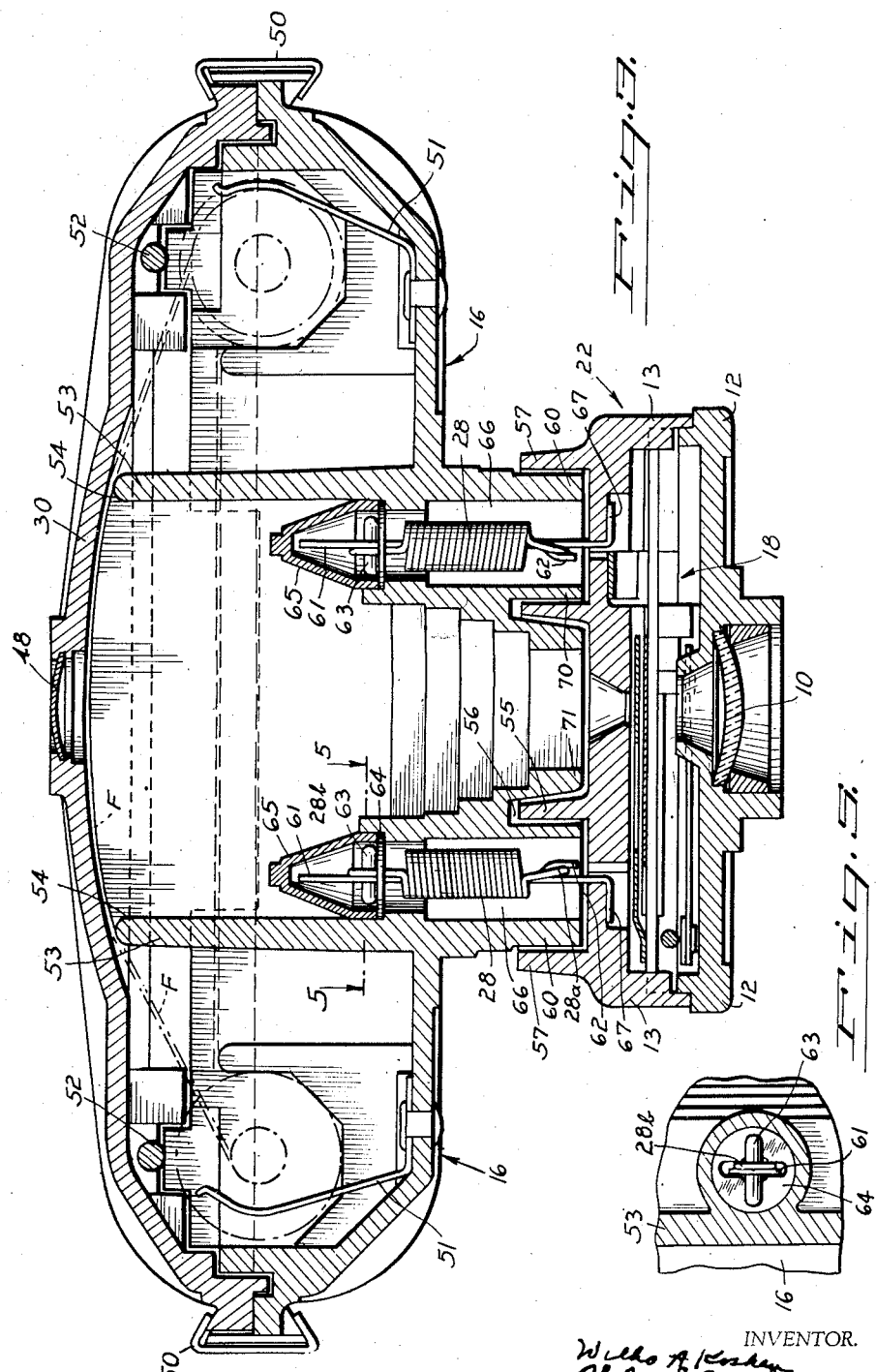
INVENTOR.
Wilho A. Kosken
Philip J. Benoracole
BY
ATTORNEY.

Jan. 26, 1943.   W. A. KOSKEN ET AL   2,309,403
PHOTOGRAPHIC CAMERA
Filed July 20, 1940   4 Sheets-Sheet 4
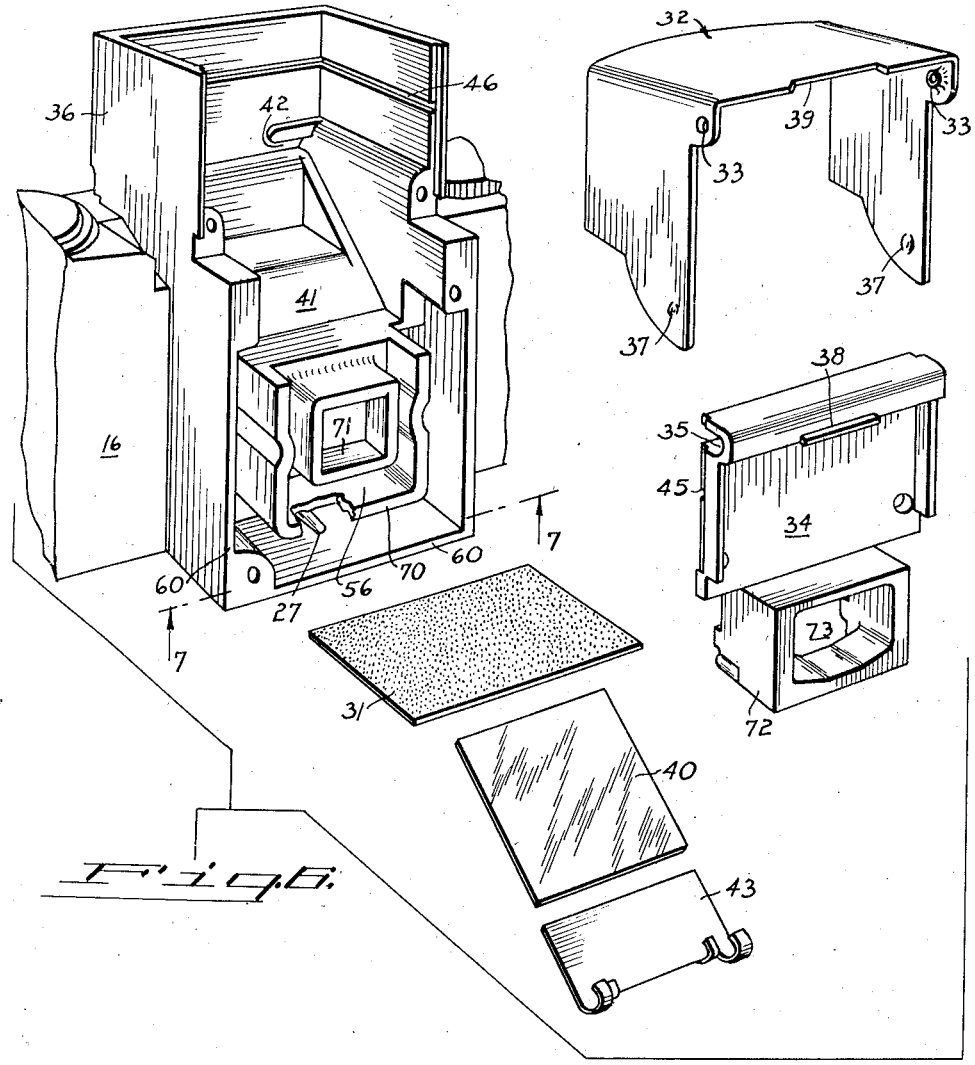
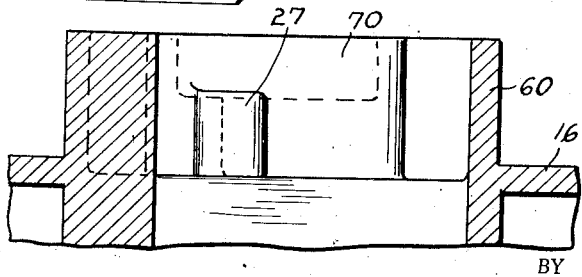
INVENTOR.
Willis A. Kosken
Philip J. Brownscombe
BY
Their ATTORNEY.

Patented Jan. 26, 1943

2,309,403

UNITED STATES PATENT OFFICE 2,309,403

PHOTOGRAPHIC CAMERA

Wilho A. Kosken, New York, N. Y., and Philip J. Brownscombe, East Orange, N. J., assignors to Universal Camera Corporation, New York, N. Y., a corporation of New York Application July 20, 1940, Serial No. 346,490

9 Claims. (Cl. 95—44)

This invention relates to improvements in photographic cameras, and is a continuation in part of the copending application, Serial No. 342,015, filed on June 24th, 1940, entitled "Improvements in shutter mechanism for cameras," and assigned to the same assignee as is the present case.

The present invention provides a compact and simplified camera construction incorporating a continuously variable focusing arrangement. The lens system and shutter mechanism are placed in a compartment which is continuously adjustable with respect to the camera body. The usual bellows or other flexible connection is eliminated with the present construction, affording an efficient, inexpensive and compact focusing system. Balanced spring biasing combined with a manually operable cam insures positive and continuous focusing over the usual practical focusing range.

The novel compact focusing arrangement is particularly applicable to a twin lens reflex camera. The simplified construction of the continuously variable focusing system permits the viewing lens to be placed close to the objective or taking lens, resulting in low parallax. A simple and effective light baffle is incorporated between the movable assembly and the camera body.

Other advantages, features and details of the present invention will become apparent in the following description of a preferred embodiment thereof, taken in connection with the drawings, in which:

Figure 3 is a horizontal cross-sectional view through the camera taken along the line 3—3 of Figure 2.

Figure 4 is an enlarged cross-sectional detail of a portion of the focusing arrangement, as taken along the line 4—4 of Figure 1.

Figure 5 is an enlarged cross-sectional detail taken along the line 5—5 of Figure 3.

Figure 6 is a dissembled view, in perspective, of components of the camera embodiment.

Figure 7 is an enlarged detailed cross-sectional view taken along the line 7—7 of Figure 6.

Figure 1:
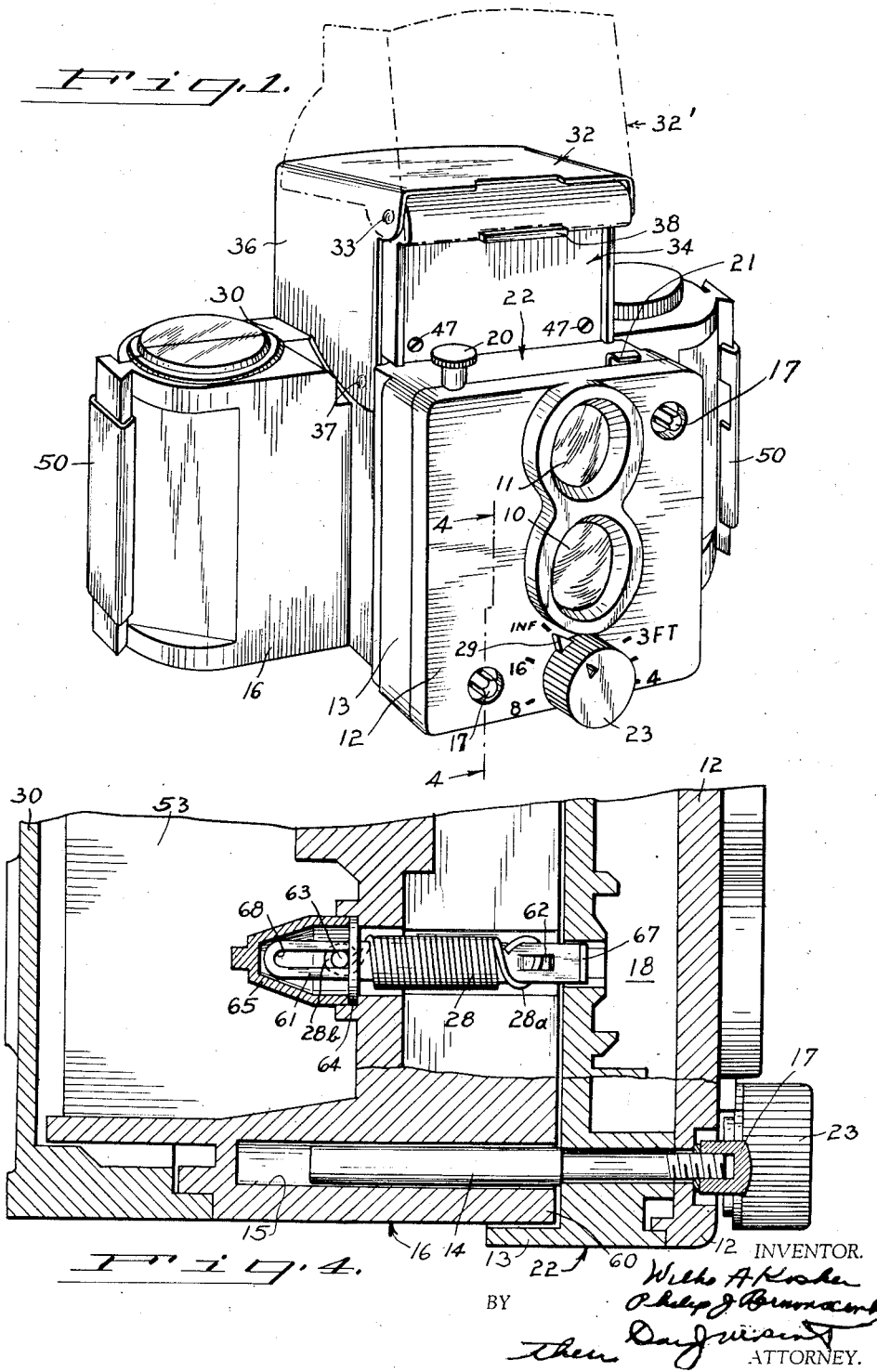
Figure 1 is a perspective view of the assembled camera.

The camera embodiment shown in perspective in Figure 1 is of the reflex focusing type having a taking lens system 10 and a viewing lens 11, closely juxtaposed thereto. Lens systems 10, 11 are set in a molded front cover 12. The shutter mechanism for the camera is contained between molded shutter housing 13 and front cover 12. Cover 12 and housing 13 are held together by guide pins 14 at opposite corners of front cover 12, which extend into corresponding grooves 15 in the camera body 16, as shown in cross-sectional Figure 4. The caps 17 cooperating with the threaded portion of guide pins 14 lock front cover 12 and shutter housing 13 into assembled relationship.

The shutter mechanism is incorporated at 18 between front cover 12 and housing 13, and may be of any suitable construction. A preferred efficient and compact shutter mechanism is disclosed in the copending application, Serial No. 342,015, referred to hereinabove. Such shutter mechanism permits close assembly between lenses 10 and 11, giving very low parallax for the reflex focusing action. Shutter knob 20 and time exposure slide 21 are slidably arranged in the lens-shutter assembly described.

Figure 2:
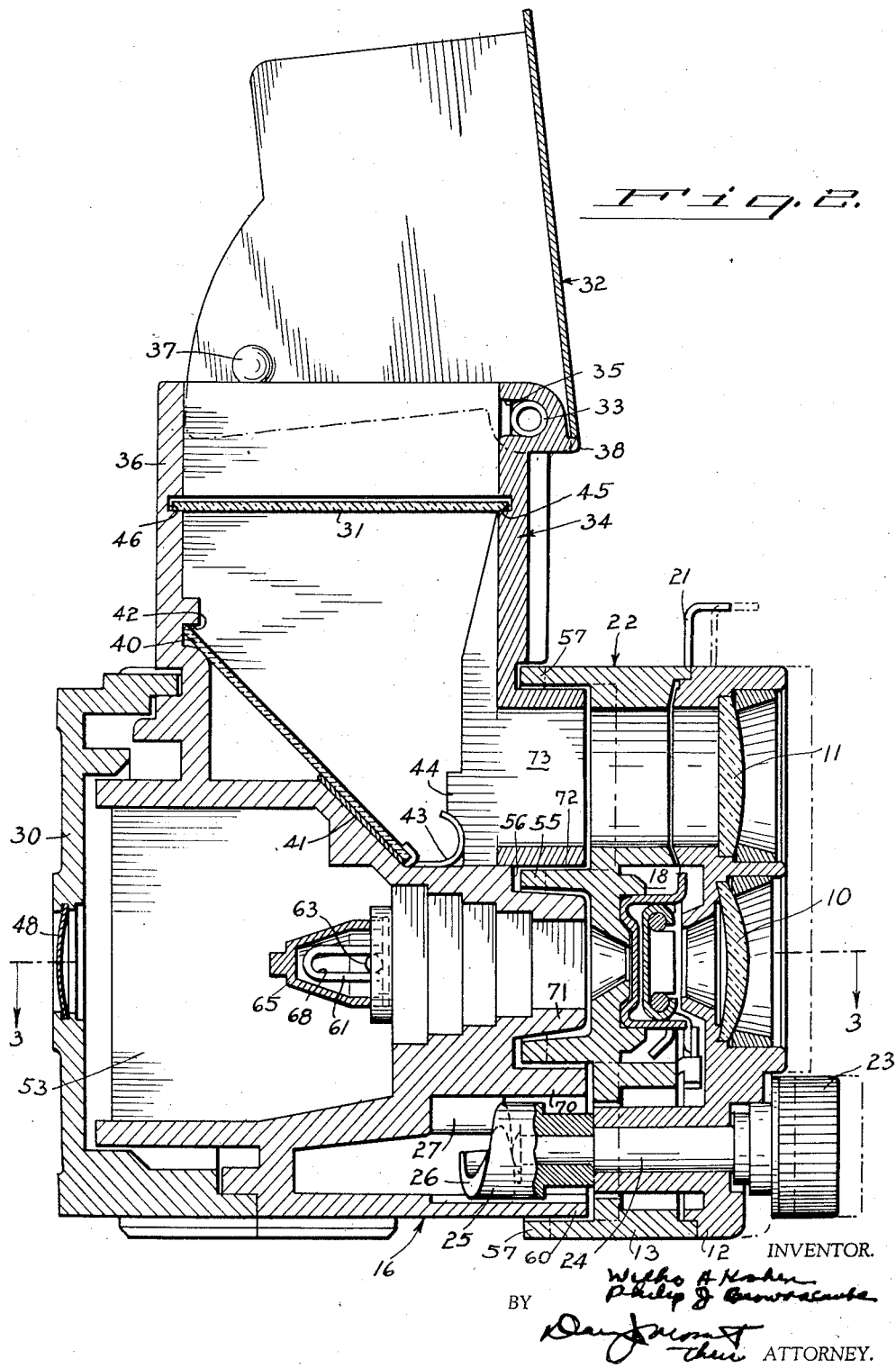
Figure 2 is a vertical cross-sectional view taken through the camera embodiment of Figure 1.

The lens-shutter arrangement incorporated between front cover 12 and shutter housing 13 constitutes a unitary movable assembly, which will be termed the "front assembly" 22. Front assembly 22 is adjustably positionable with respect to the camera body 16, containing the film to be exposed. Front assembly 22 is moved with respect to body 16 on guide pins 14, 14 as controlled through focusing knob 23 secured to focusing cam 25 by rod 24 (Figure 2). The cam surface 26 of cam 25 operates against a cam web 27 incorporated in the molded structure of the camera body 16.

Two spaced opposed springs 28, 28 continually mechanically bias front assembly 22 toward camera body 16, as shown in Figures 3 and 4. This action causes cam surface 26 to press against cam web 27 so that rotation of focusing knob 23 adjustably positions the front assembly 22. A pointer 29 extending from knob 23 operates on a scale inscribed or molded on front cover 12 to controllably position the lens system. A full range of focusing adjustment is possible with the mechanical biasing and cam combination of the invention.

The camera consists of a light-tight chamber, composed of the molded camera case or body 16 slidably carrying front assembly 22, and rear cover 30. The camera assembly 16, 30 serves as a storage chamber for the film F, and holds the film in the proper optical relation with respect to taking lens 10. The shutter mechanism 18, within front assembly 22, controls the length of exposure in the usual manner. The viewing lens 11 is designed with the same focal characteristics as those of the taking lens. The image produced by the viewing lens is reflected against the ground focusing screen 31 by inclined mirror 40. Mirror 40 rests against a slope 41 in the camera body 16, and fits against the slot 42 thereof. The mirror 40 is held in position by the spring action of the mirror retainer 43 against the case portion 44. The best focusing position is obtained by adjusting focusing knob 23 until the image is in best focus on screen 31 (Figure 2).

A hinged shield 32 is arranged above focusing screen 31 to limit the amount of extraneous light falling upon the screen. Shield 32 is pivoted on two extruded journals 33 which fit into suitable partial bearings 35 of the case front section 34. When case front 34 is fitted against upwardly extending portion 36, the bearings for extruded portions 33, 33 are completed. Dents 37, 37 are provided on the extended sides of light shield 32 to press against the sides of upwardly extending camera body portion 36 and hold shield 32 stably thereon. A lip 38 extending from case front 34 limits the upward pivotal movement of shield 32 to the dotted position 32' shown in Figure 1, and also as shown in section in Figure 2. A recess 39 in the shield coacts with lip 38 at the limiting poistion. The resilient nature of the extended sides of shield 32 in conjunction with the inwardly extending dents 37, 37 thereon firmly holds shield 32 in the open position as well as in the closed positions.

The case front 34 contains a groove 45 which supports ground screen 31 in the horizontal position in conjunction with groove 46 along the camera case portion 36. The case front 34 is fitted into its premolded formation of case portion 36, and is held thereon with two simple screws 47, 47. Screen 31 is thus readily assembled and locked in position. The back cover 30, containing the usual ruby pane 48 for noting the film number, is secured to case 16 by sliding locks 50, 50, affording a positive locking action. The respective components of the camera are molded in a manner to readily fit together and form an interlocking assembly, as will now be evident to those skilled in the art.

The spooled film F, when inserted in the camera, is prevented from unrolling by cradle springs 51, 51 which are riveted to case 16. Spool rollers 52, 52 roll in cradles on back cover 30, and prevent binding of the film spools when the film F is wound from one spool to the other. The film track is curved as noted in Figure 3 to improve the photographic image at the corners of the picture. Legs 53, 53 extend from the front of the camera body 16 toward the rear cover 30. Legs 53 have rounded end portions 54, over which film F is guided against the curved portion of back cover 30. There is accordingly no need for pressure pads to keep the film against the curved track.

An important feature of the present invention resides in the compact focusing arrangement without the use of bellows or other flexible connections between the front optical assembly (corresponding to 22) and the camera body 16 which contains the film. A rigid light baffle construction is incorporated between the movable front assembly 22 and the camera body 16. A rectangular extension 55 from shutter housing 13 coacts with a corresponding rectangular groove 56 in the interior of the camera body. The continuous extending portion 55 surrounds the light baffle between taking lens 10 and the film track. The depth of extension 55 and the associated groove 56 corresponds to the movement of front assembly 22 for the required focusing range.

Shutter housing 13 has a further extension 57 overlapping the forwardly projecting portion 60 of the camera body 16. Front assembly 22 is accordingly loosely positionable with respect to the camera body 16, and an efficient light trapping arrangement is afforded by the overlapping portions 55, 56 and 57, 60. The effective labyrinth construction serves as a light baffle to prevent light from entering the camera interior except from taking lens 10, through the range of focusing movement of the front assembly.

The front assembly 22 is continually spring-biased toward camera case 16 by means of springs 28, 28 arranged about respective stop slides 61, 61. One end 28a of spring 28 is looped about a lug 62 of slide 61. The other end 28b of spring 28 is looped about anchoring pin 63 which is held fixed against separable base 64 of a sealing cap 65. Sealing cap 65 is cemented into the camera case to trap any light which otherwise might pass around the baffle section 57, 60 into the spring channels. An elbow 67 extends from the end of stop slide 61 to grip onto shutter housing 13.

Stop slide 61 contains a slot 68 through which pin 63 is inserted. Slot 68 of stop slide 61 serves to limit the outward movement to front assembly 22, as will now be evident. The sealing caps 65 are cemented to the case after pins 63 are inserted through respective stop slide slots 63 and end 28b of springs 28. Figure 5 is a cross-sectional view taken along the line 5—5 of Figure 3 showing a detail of this assembly, in end view. Springs 28, 28 are maintained in tension to afford the required biasing action, which action is suitably guided by stop slides 61, 61.

The perspective, dissembled view of the camera, Figure 6, graphically illustrates the light trapping section comprising outer section 60 and groove 56 between spaced walls 70, 71 for accommodating the continuous rectangular extension 55 from shutter housings 13. The upper part of wall 70 is formed by the lower surface 72 of case front section 34. The opening 73 provided in lower section 72 of case front 34 is for the light passing from viewing lens 11 towards mirror 40.

The camera components illustrated in Figure 6 show the ready manner by which they are assembled and fitted together into a stable arrangement. The camera is relatively simple to manufacture and assemble, and is very serviceable. The cam web 27 integral with the lower side of light baffle wall 70 coacts with cam surface 26 through the action of tension springs 28, 28 described. Springs 28, 28 are arranged equidistant with respect to the central position of cam 25 to give a balanced action and insure a uniform focusing movement of the front assembly 22 which contains the lens and shutter systems. The design of cam surface 26 controls the movement of front assembly 22 under the rotation of focusing knob 23. The adjacent scale on front cover 12 corresponds to the optical design of the camera as well as the mechanical design of cam surface 26. The focusing adjustment is readily effected by even a novice, and is foolproof and as effective as prior more complex constructions.

Although the present invention has been disclosed in connection with a preferred embodiment thereof, it is to be understood that modifications may be made in the arrangement and structural details without departing from the broader spirit and scope thereof as defined in the appended claims.

What we claim is:

1. The combination with a camera case of a front assembly containing a lens system slidably coactive wall formations on the case and front assembly embodying a baffle arrangement permitting relative focusing movement between said assembly and case while trapping light into the case interior, resilient means secured between said front assembly and said camera case for continuously urging said assembly towards said case, a cap arranged about the anchor of said resilient means in said case for shielding light around said resilient means into the case interior, and a cam located symmetrically with respect to said resilient means for stably controlling the position of said front assembly with respect to said camera case.

2. The combination with a camera case of a front assembly containing a lens system slidably coactive wall formations on the case and front assembly embodying an arrangement permitting relative focusing movement between said assembly and case, a spring means secured between said front assembly and said camera case for continuously urging said assembly towards said case in balanced relation, stop slides on said case and associated with said spring means for limiting the outward movement of said front assembly from said case, and means located symmetrically with respect to said spring means for stably controlling the position of said front assembly with respect to said camera case including a cam, a knob exterior of said assembly and a member connecting said cam and knob.

3. The combination with a camera case of a front assembly containing a lens system slidably coactive wall formations on the case and front assembly embodying a baffle arrangement permitting relative focusing movement between said assembly and case while trapping light into the case interior, spring means secured between said front assembly and said camera case for continuously urging said assembly towards said case, stop slides on said case associated with said spring means for limiting the outward movement of said front assembly from said case, guide pins extending from said front assembly into grooves in said case, and means for stably controlling the position of said front assembly with respect to said camera case to effect continuous focusing action including a cam, a knob exterior of said assembly, a rod connecting said cam and knob and a cam web on said case engaged with said cam.

4. The combination with a camera case having contiguous exposure and finder chambers, a front assembly having contiguous taking and viewing lens and movable with respect to the case for focusing, coaxial wall formations surrounding the exposure chamber, and a wall formation on said front assembly surrounding the taking lens and slidably coactable with the coaxial wall formations of the case, a peripheral wall on the case and a wall on the front assembly enclosing and slidably coactable with the peripheral wall of the case, the respective coactable walls serving to permit relative focusing movement between the assembly and case while trapping light towards the exposure chamber, resilient means secured between said front assembly and said case for continuously urging said front assembly towards said case, and means for stably controlling the front assembly with respect to the case to effect continuous focusing action as said front assembly is moved relative to the case.

5. The combination with a camera case having contiguous exposure and finder chambers, a front assembly having contiguous taking and viewing lens and movable with respect to the case for focusing, wall formations in the case enclosing and separating respectively the exposure and finder chambers, and wall formations in the front assembly enclosing and separating respectively the taking and viewing lens, the wall formations on the front assembly and case being slidably coactable for permitting relative focusing movement between the front assembly and the case while trapping light into the exposure and finder chambers.

6. The combination with a camera case having contiguous exposure and finder chambers, a front assembly having contiguous taking and viewing lens and movable with respect to the case for focusing, wall formations in the case enclosing and separating respectively the exposure and finder chambers, and wall formations in the front assembly enclosing and separating respectively the taking and viewing lens, the wall formations on the front assembly and case being slidably coactable for permitting relative focusing movement between the front assembly and the case while trapping light into the exposure and finder chambers, resilient means secured between said front assembly and said case for continuously urging the front assembly towards the case and means for stably controlling the front assembly with respect to the case to effect continuous focusing action as the front assembly is moved relative to the case.

7. The combination with a camera case having contiguous exposure and finder chambers, a front assembly having contiguous taking and viewing lens and movable with respect to the case for focusing, coaxial wall formations surrounding the exposure chamber and a wall formation on said front assembly surrounding the taking lens and slidably coactable with the coaxial wall formations of the case for permitting relative focusing movement between the assembly and case while trapping light towards the exposure chamber, resilient means secured between said front assembly and said case for continuously urging said front assembly towards said case, a cap mounted about the anchorage of the resilient means to the case for shielding light around the resilient means from the interior of the case, and means for stably controlling the front assembly with respect to the case to effect continuous focusing action as said front assembly is moved relative to the case.

8. The combination with a camera case having contiguous exposure and finder chambers, a front assembly having contiguous taking and viewing lens and movable with respect to the case for focusing, coaxial wall formations surrounding the exposure chamber, and a wall formation on said front assembly surrounding the taking lens and slidably coactable with the coaxial wall formations of the case, a peripheral wall on the case and a wall on the front assembly enclosing and slidably coactable with the peripheral wall of the case, the respective coactable walls serving to permit relative focusing movement between the assembly and case while trapping light towards the exposure chamber, resilient means secured between said front assembly and said case for continuously urging said front assembly towards said case, a cap mounted about the anchorage of the resilient means for shielding light therearound from the interior of the case, and means for stably controlling the front assembly with respect to the case to effect continuous focusing action as said front assembly is moved relative to the case.

9. The combination with a camera case having contiguous exposure and finder chambers, a front assembly having contiguous taking and viewing lens and movable with respect to the case for focusing, wall formations in the case enclosing and separating respectively the exposure and finder chambers, and wall formations in the front assembly enclosing and separating respectively the taking and viewing lens, the wall formations on the front assembly and case being slidably coactable for permitting relative focusing movement between the front assembly and the case while trapping light into the exposure and finder chambers, resilient means secured between said front assembly and said case for continuously urging the front assembly towards the case, a cap mounted about the anchorage of the resilient means to the case for shielding light around the resilient means from the interior of the case, and means for stably controlling the front assembly with respect to the case to effect continuous focusing action as the front assembly is moved relative to the case.

PHILIP J. BROWNSCOMBE.
WILHO A. KOSKEN.